US009026851B2

(12) United States Patent
Mondal et al.

(10) Patent No.: US 9,026,851 B2
(45) Date of Patent: May 5, 2015

(54) SYSTEM AND METHOD FOR INTELLIGENT TROUBLESHOOTING OF IN-SERVICE CUSTOMER EXPERIENCE ISSUES IN COMMUNICATION NETWORKS

(71) Applicants: Subhas Chandra Mondal, Bangalore (IN); Sudipta Ghosh, Kolkata (IN); Manoj K. Nair, Bangalore (IN)

(72) Inventors: Subhas Chandra Mondal, Bangalore (IN); Sudipta Ghosh, Kolkata (IN); Manoj K. Nair, Bangalore (IN)

(73) Assignee: Wipro Limited, Bangalore (IN)

( * ) Notice: Subject to any disclaimer, the term of this patent is extended or adjusted under 35 U.S.C. 154(b) by 160 days.

(21) Appl. No.: 13/752,632

(22) Filed: Jan. 29, 2013

(65) Prior Publication Data

US 2014/0068348 A1 Mar. 6, 2014

(30) Foreign Application Priority Data

Sep. 5, 2012 (IN) .......................... 3679/CHE/2012

(51) Int. Cl.
*G06F 11/07* (2006.01)
*H04L 12/24* (2006.01)
*H04L 12/26* (2006.01)
(Continued)

(52) U.S. Cl.
CPC .......... *G06F 11/079* (2013.01); *G06F 11/0709* (2013.01); *H04L 41/16* (2013.01); *H04L 43/12* (2013.01); *H04L 41/0631* (2013.01); *G06Q 10/10* (2013.01); *G06Q 50/10* (2013.01)

(58) Field of Classification Search
CPC ..... H04L 41/16; H04L 43/12; H04L 41/0631; G06F 11/079; G06F 11/709; G06F 11/2294; G06F 11/3055; G06F 2201/875
See application file for complete search history.

(56) References Cited

U.S. PATENT DOCUMENTS

| 6,147,975 | A   |    | 11/2000 | Bowman-Amuah |          |
|-----------|-----|----|---------|--------------|----------|
| 7,171,337 | B2  | *  | 1/2007  | Yuan et al.  | 702/185  |
| 7,293,201 | B2  | *  | 11/2007 | Ansari       | 714/38.14|

(Continued)

OTHER PUBLICATIONS

Telecoms.com, "Operators getting smarter on VIP subscribers with Astellia's CEM solution," available at http://www.telecoms.com/46595/operators-getting-smarter-on-vip-subscribers-with-astellia%E2%80%99s-cem-solution/ (Jul. 10, 2012).

(Continued)

*Primary Examiner* — Nadeem Iqbal
(74) *Attorney, Agent, or Firm* — Finnegan, Henderson, Farabow, Garrett & Dunner, LLP

(57) ABSTRACT

The present disclosure relates to methods and systems for improving customer experience through real time troubleshooting in relation to customer experience management. In one embodiment, a proactive customer experience management method is disclosed, comprising: obtaining a performance-indicating alert (PA); identifying relevant alerts from the alert database in absence of possible fault condition from the PA; determining a possible problem condition from the PA and identified relevant alerts; raising trace trigger for gathering relevant trace data; determining specific problem condition and relevant cause, based on gathered trace data and relevant data from PM/FM, CDR, OSS systems; determining appropriate recommendation for resolution of the determined specific problem condition; updating a user interface dashboard using the determination of the root cause of the possible problem and the recommendation for resolution of the possible problem; and updating new knowledge into a knowledge base with problem-context, resolution, relevant adjustments to alerts, thresholds and rules.

15 Claims, 11 Drawing Sheets

(51) Int. Cl.
    *G06Q 10/10*     (2012.01)
    *G06Q 50/10*     (2012.01)

(56) References Cited

U.S. PATENT DOCUMENTS

| | | | |
|---|---|---|---|
| 7,779,101 B1* | 8/2010 | Zahavi et al. | 709/223 |
| 7,941,136 B2 | 5/2011 | Reed et al. | |
| 8,181,069 B2* | 5/2012 | Gupta et al. | 714/45 |
| 8,260,871 B2* | 9/2012 | Fallen et al. | 709/207 |
| 2008/0209280 A1* | 8/2008 | Dilillo et al. | 714/48 |
| 2009/0177926 A1* | 7/2009 | Schneider et al. | 714/37 |
| 2011/0310744 A1* | 12/2011 | Besset et al. | 370/241 |
| 2012/0143795 A1* | 6/2012 | Han et al. | 706/12 |

OTHER PUBLICATIONS

MCI Executive Interview, "Delivering on experience," available at http://astellia.com/sites/default/files/MCI_Interview_2012.pdf (2012).

Radcom, "The Cellular Performer: Cellular Network Analyzer," available at http://www.sygnus.co.uk/sourcedocs/Datasheets/Radcom/Cellular%20Performer.pdf (Jan. 2003).

* cited by examiner

Mean RTT Abis (M abis) = $\dfrac{(I1_{respA} - I1_{reqA}) + (I2_{respA} - I2_{reqA}) + \ldots + (In_{respA} - In_{reqA})}{dT1A \qquad dT2A \qquad dTnA}$ Mean RTT Abis (M Gb) = $\dfrac{(T1_{respB} - T1_{reqB}) + (T2_{respB} - T2_{reqB}) + \ldots + (Tn_{respB} - Tn_{reqB})}{dT1B \qquad dT2B \qquad dTnB}$ Standard Deviation Abis ($\sigma_{abis}$) = $\sqrt{\sum(dTnA - M_{abis})^2 / n}$ Standard Deviation Gb ($\sigma_{Gb}$) = $\sqrt{\sum(dTnB - M_{Gb})^2 / n}$ Normalized max RTT (z-score)

$RTT_{norm\ abis} = (\mu_T Abis - M_{abis}) / \sigma_{abis}$
$RTT_{norm\ Gb} = (\mu_T Gb - M_{Gb}) / \sigma_{Gb}$
$RTT_{norm\ Gn} = (\mu_T Gn - M_{Gn}) / \sigma_{Gn}$
$RTT_{norm\ Gi} = (\mu_T Gi - M_{Gi}) / \sigma_{Gi}$ Where $\mu_T$ is the theoretical mean suggested by the network vendor based on their system testing.

Quantitative Measurement of KPI
Weight for Web Browsing Service

FIG. 3B $$\text{Sum RTT}_{\text{norm}} \text{Score} = \text{RTT}_{\text{norm abis}} + \text{RTT}_{\text{norm Gb}} + \text{RTT}_{\text{norm Gn}} + \text{RTT}_{\text{norm Gi}}$$

$$\text{Weightage for Abis KPIs} = \frac{\text{RTT}_{\text{norm abis}}}{\text{Sum RTT}_{\text{norm}} \text{Score}} \times 100$$

$$\text{Weightage for Gb KPIs} = \frac{\text{RTT}_{\text{norm Gb}}}{\text{Sum RTT}_{\text{norm}} \text{Score}} \times 100$$

$$\text{Weightage for Gn KPIs} = \frac{\text{RTT}_{\text{norm Gn}}}{\text{Sum RTT}_{\text{norm}} \text{Score}} \times 100$$

$$\text{Weightage for Gi KPIs} = \frac{\text{RTT}_{\text{norm Gi}}}{\text{Sum RTT}_{\text{norm}} \text{Score}} \times 100$$

FIG. 3C

SYSTEM AND METHOD FOR INTELLIGENT TROUBLESHOOTING OF IN-SERVICE CUSTOMER EXPERIENCE ISSUES IN COMMUNICATION NETWORKS

PRIORITY CLAIM

This application claims, pursuant to 35 U.S.C. §119, the benefit of India Provisional Application No. 3679/CHE/2012, entitled "System and method for intelligent troubleshooting of in-service customer experience issues in communication networks," filed on Sep. 5, 2012, the entirety of which is incorporated herein by reference.

TECHNICAL FIELD

The present disclosure generally relates to customer experience management systems for communication networks, and more particularly to methods and systems for improving customer experience through real time troubleshooting in relation to customer experience management.

BACKGROUND

Demand for fast and reliable broadband service is as strong as ever. Modern communication service providers (CSPs) offer a wide variety of communications services to their subscribers, such as voice telecommunication, text messaging and high-speed data services. Customers want to be continuously connected to their social networking sites and want real-time updates. They are increasingly becoming reliant to the network traffic sensitive services like multimedia content streaming, VoIP, and the like. More software and devices require the actual data and content to be stored in the cloud and delivered over broadband infrastructure on demand. In addition, recent proliferations of mobile devices like smartphones and tablets have significantly increased mobile data usage. Exponentially growing mobile data usage has lead to the development of high speed wireless communication network standards such as Worldwide Interoperability for Microwave Access (WiMAX) and Long Term Evolution (LTE), which can provide data transfer rates comparable to or even higher than a typical wired network.

As a result, customers expect high quality services from CSPs anytime, anywhere, and on any type of device. Meeting ever-increasing customer expectations is not an easy task for CSPs. Not only do CSPs need to expand their service coverage areas, but they need to constantly improve interoperability between evolving hardware and software systems to optimize their network configurations. For this reason, customer experience management (CEM) is becoming a fundamental tool for CSPs. This is especially true for mobile CSPs which often point to their network speed and coverage areas to attract and retain subscribers.

It is accordingly a primary object of the invention to implement systems and methods for improved customer experience management solutions capable of proactively monitoring key performance indicators and key quality indicators, and performing real time troubleshooting along with potential problem/fault alerts.

SUMMARY

In one embodiment, a proactive customer experience management method is disclosed, comprising: obtaining a performance-indicating alert (PA); identifying relevant alerts from the alert database in absence of possible fault condition from the PA; determining a possible problem condition from the PA and identified relevant alerts; raising trace trigger for gathering relevant trace data; determining specific problem condition and relevant cause, based on gathered trace data and relevant data from PM/FM, CDR, OSS systems; determining appropriate recommendation for resolution of the determined specific problem condition; updating a user interface dashboard using the determination of the root cause of the possible problem and the recommendation for resolution of the possible problem; and updating new knowledge into a knowledge base with problem-context, resolution, relevant adjustments to alerts, thresholds and rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

FIGS. 3A-3C illustrate exemplary weightage calculations of key performance indicator values according to embodiments of the present disclosure.

DETAILED DESCRIPTION

Figure 1:
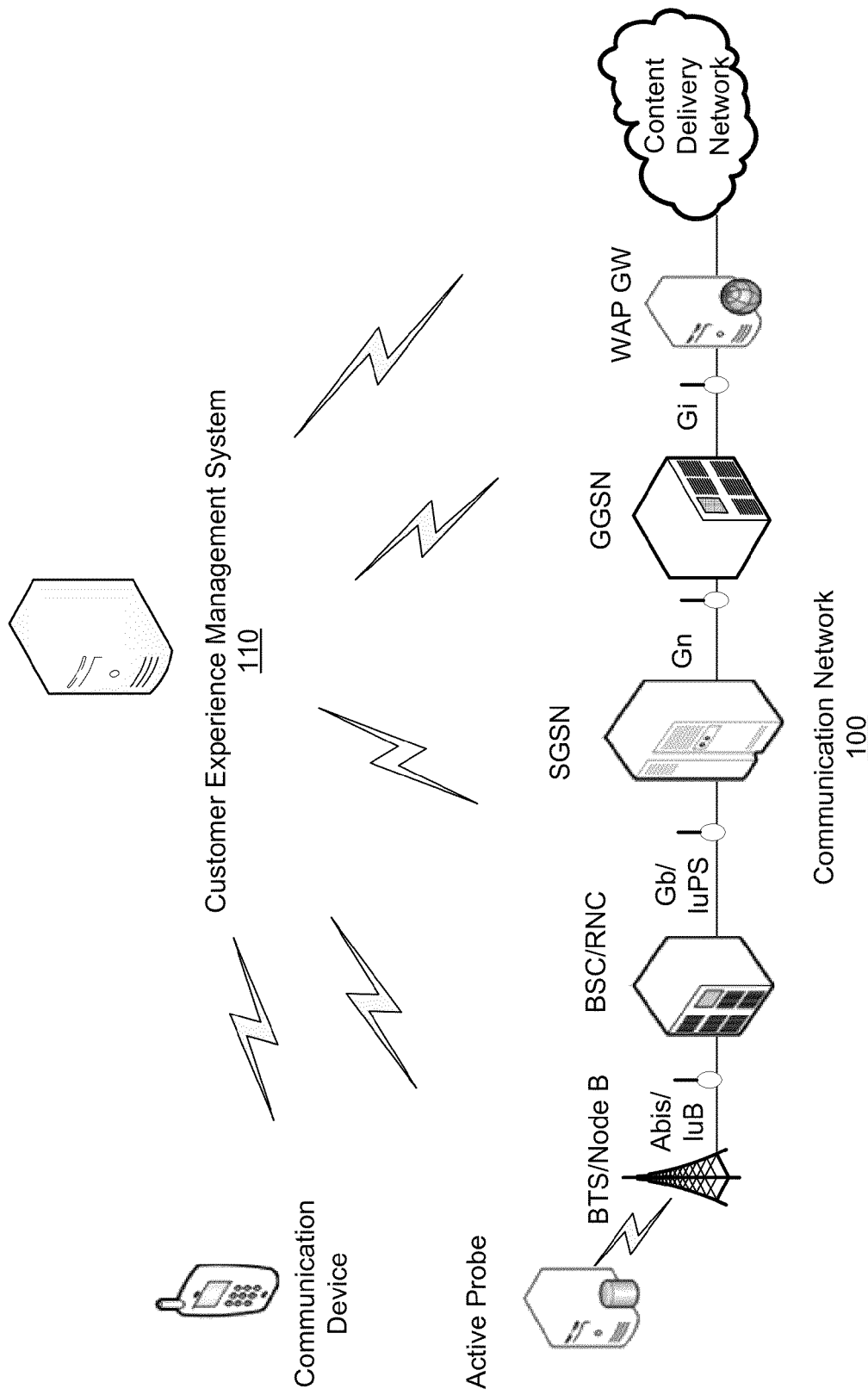
FIG. 1 is a schematic illustration of an exemplary communication network.

Reference will now be made in detail to exemplary embodiments of the invention, examples of which are illustrated in the accompanying drawings. Wherever possible, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

In the following description, numerous specific details are set forth to provide a thorough understanding of the present invention. However, it will be clear to one skilled in the art that the present invention may be practiced without some or all of these specific details. In other instances, well known process steps have not been described in detail in order to avoid unnecessarily obscuring the present invention.

A Customer Experience Management (CEM) system for communication networks, with automated and improved fault detection process, is disclosed. The CEM system may enable proactive measurement of customer experience by processing discrete network events in substantially real-time basis and identify a pattern that leads to the root causes of potential problems before the event transforms into a major customer experience impacting issue. The disclosed CEM solutions automate measuring customer experience and mapping of the analysis logic into tangible and reusable assets.

CEM may involve a number of factors related to customer lifecycle management, including technical and non-technical aspects. CEM, in various embodiments, may detect problems that occurred in prior customer service sessions, or those in ongoing sessions in real-time, or those that may arise in future sessions, and provide effective problem resolution for any of these types of problems.

As an illustration, consider the example of a CEM for a web browsing session of a customer utilizing a mobile device that communicates with a web server via a cellular network. Such a networking system may include a large number of physical sub-systems, network components, and logical/application layers operating according to complex protocols, making problem identification, analysis or resolution difficult tasks. For example, when the customer travels from a geographical area wherein the system provides good network service to one that provides poorer network service, the customer may experience degradation of the web browsing experience due to an increase in a bit-error rate associated with the communication via the cellular network. For example, excessive retransmission of the same data packets may occur due to high packet loss during transmission. In such a scenario, identifying poor last-mile network service as the issue affecting the quality of service at the customer's mobile phone may be complicated because alternate causes may be plausible, e.g.: too many customer service sessions being handled by the network; improper load-balancing at the web gateway causing it to not be able to schedule the content for delivery to the customers' mobile devices in a timely fashion; etc., or combinations of such causes. CEM in this context may provide in-service quality management, including identifying customer service-sessions, detecting customer-session quality problems, analyzing the complete service delivery chain to identify the root cause of the problem, and providing effective problem resolution. CEM may perform such problem resolution by intelligent modeling of all (or some) of the components included in providing the service. CEM may automatically learn trends in usage, performance, etc. of the system, to identify normal or expected performance. CEM may also identify any deviations from such expected performance based on for example, prior aggregated knowledge, and initiate quality management analysis, troubleshooting, and resolution.

For example, assume that, in the context of the web browsing session discussed above, the customer experiences an average download throughput rate of 1 Mbps during a time where a peak number of customer service sessions are being handled by the network, and a throughput rate of 2 Mbps otherwise. CEM may learn such trends in network system performance as a function of time. Then, in a scenario where the download throughput rate for a customer service session deviates significantly from these learned trends, CEM may initiate additional data gathering from relevant performance monitoring sources, perform a root cause analysis, identify a (partial) root cause, and/or suggest or initiate procedures for resolving the (partial) root cause of the deviation from the expected network system performance. In some embodiments, CEM may predict future deviations in network system performance based on aggregated data, e.g., a current or historical deviation in number of customer service sessions being initiated or terminated; a current or historical rate of change in the number of customer service sessions being initiated or terminated; a current or historical deviation in the average download throughput rate for a customer service session; etc.

CEM-based network and service monitoring solutions may emphasize quality of service (QoS) measured from the network, including key performance indicators (KPIs). These KPIs are computed aggregations of multiple network performance counters and timers. For example, in a mobile data service network, the service accessibility may be determined through the Packet Data Protocol (PDP) Context Activation Success Rate KPI, which may be an aggregated ratio of the successful PDP context activations to PDP context attempts. This KPI indicates the ability of the mobile subscriber to access the packet switched service.

While KPIs and QoS are parameters to evaluate the quality of network operations, these indicators may not provide a holistic view of the actual customer experience. For example, consider a packet switch call where a file access time extends beyond the quality threshold. Here, high latency may be due to account redirections at the application layer such as "HTTP 302", which may not be generally detected by traditional network-side measurement techniques. Yet, higher waiting time results in a poor customer experience.

In another scenario, a customer trying to access content such as photo albums or rich media feeds expects to download and render an image as fast as possible. The experience could be annoying if CSPs do not have a content adaptation/acceleration mechanism to compress the data and to render the content appropriately based on handset capability. For example, normal KPI based performance measurements may not provide a true reflection of the experience when content adaptation and acceleration are implemented in the CSP service environment. In addition, it is a common practice for CSPs to setup multiple transport control protocol (TCP) connections between user equipment and the content server to accelerate content download. Although this technique has advantages, it could actually provide poor content delivery time for handsets without the processing capacity to handle multiple TCP connections simultaneously.

In the cases mentioned above, traditional quality measurement techniques fail to record and measure incidents and do not show any anomalies or performance issues. In addition, customers may experience considerable lag in content download and the service quality falls below their expectations. Such unnoticed incidents often lead to customer dissatisfaction, which in turn, may lead to loss of subscribers to CSPs.

User experience may be impacted by multiple touch points such as network KPI's, end-user-device KPI's and application KPI's. In an exemplary CEM system, the network KPI's may be measured using interface probes (Iu, Gb, Gn, Gi—3GPP defined standard interfaces in the wireless network). But in traditional Customer Experience Management Systems (GEMS), the application related KPI's and end-user-device KPI's are not taken into consideration for estimating end-user experience. For example, in the case of a mobile streaming video, the performance of the session may depend on the available bandwidth, round trip time (RTT), jitter, streaming server load and the device performance. While these represent network KPIs, server loads and device performance will be service layer and device layer aspects that may influence end user experience of the streaming video service. The RAN layer network resources such as timeslot allocation, scheduling priority may be localized within Gb/Iu standard interface connecting the cellular base station to the base station controller in the wireless network. Hence the Gn interface probe may not have all the network layer views unless it is correlated to the Gb/Iu layer probe information.

Moreover, typical customer experience management solutions focus on reporting of service performance matrix at the end user level. In other words, typical CEM systems collect customer specific transaction data from probes and produces service Key Quality Indicators (KQIs) on a per customer basis. This only provides a periodic view of service performance on per customer basis. Also, typical CEM systems only monitor service quality at individual interface level probes using the transaction records generated at the end of every service transactions. These transaction records undergo a lengthy data transformation process before they are updated into the CEM system databases for further analysis. The data necessary for tracking down the underlying cause of the problem, such as protocol trace data, may not be available by the time the transaction records are ready for analysis. This may limit the ability of CEM systems to perform the end-to-end transaction data analysis and identify the root cause of the problems and/or network faults. Although the CEM systems may provide a summary report of customer experiences based on the KPI and KQI for a particular service transaction, a service management team may still be required to interpret the KPI and KQI values and manually track down the root cause of the problems.

The systems and methods disclosed herein incorporate a rule based selective tracing mechanism and smart analytics to solve the problem of the existing customer experience management solutions. The selective tracing component may serve multiple purposes. For example, it may help in filtering and managing customer transaction related data and automating the customer experience troubleshooting. One component included in this solution may be a rule engine that supports complex event processing. The selective tracing solution may monitor events and transactions from the connected data sources and dynamically processes the events against predefined rules. The rules can be simple condition check or can be complex calculation followed by comparison with a predefined threshold. Once the rules engine processes the events and transactions, the results can be streamed to a notification system or used to analyze the root cause or further can be routed to capture sufficient details from underlying systems. The customer experience management system gives flexibility to program the rules based on the requirement and can be activated at run time. This approach is also useful for troubleshooting customer experience issues because the operations engineer can program the rules and execute it to capture custom information pertaining to the customer.

With the selective tracing framework, a new layer of intelligence can be built on top of the existing tools deployed in the CSP network. Thus, rule based selective tracing serves CSPs in managing customer experience data, automating customer experience measurement and also in mapping the analysis logic in to tangible and reusable assets. Another advantage may include the provision of CSPs that can focus on and prioritize issues that are critical and revenue/brand impacting, rather than issues which are less critical.

Analytics may be another approach to control the information overload problem related to CEM. Operations generate tremendous amount of data such as billing and location information, mobile transactions, online behavior and network conditions, but the sheer volume of data makes it incredibly unwieldy. A tier-one operator might have millions of subscribers which yield billions of transactions per day—close to a Petabyte of data. There may be challenges in managing this data and deriving meaningful customer insights. A robust analytical framework can enable CSPs to correlate the data from different sources and produce statistics useful for different business units in the service provider organization. Analytics framework could also help CSPs to drill down and analyze multiple dimensions of customer experience through a user friendly interface. This may result in quick identification of patterns and may expedite the troubleshooting process much earlier. The analytics framework may also provide flexibility to the operations team to build custom rules for data correlation or aggregation at run time to identify patterns.

Not only do these solutions enable proactive measurement of customer experience by processing discrete network events in near real time, but they also help in identifying a pattern that leads to root cause analysis and automatic recommendations before the event transforms into a major customer impacting issue.

In an embodiment, the improved CEM system may proactively monitor all KPIs and KQIs on a per-service per user session basis. The CEM system may use intelligent analysis to detect potential service degradation problems, identify the root-causes for the problem, and suggest possible solutions for addressing the problems and their root causes. For example, the CEM system may proactively monitor degradation in performance parameters such as Return Trip Time (RTT), jitter, or throughput at different levels to predict possible service problems. The CEM system may use information from systems aimed at Operation Support Service (OSS), FM/PM, or Network configuration. Other available data may relate to Network-probes, subscriber profiles, and historical files. The CEM system may also proactively generate a per customer per service performance dashboard in substantially real-time, along with possible problems and network fault alerts.

Exemplary Communication Network

FIG. 1 illustrates an exemplary communication network 100, where a CEM system 110 may be deployed. The communication network 100 may comprise any wired or wireless network that provides communication connectivity for devices. The communication network 100 may include various cellular network and packet data network components such as a base transceiver station (BTS), a node-B, a base station controller (BSC), a radio network controller (RNC), a service GPRS support node (SGSN), a gateway GPRS support node (GGSN) and a WAP gateway connected to a content delivery network. Although not shown in FIG. 1, the network 100 may further include network components including, but not limited to, mobile switching center (MSC), short message service centers (SMSC), a home location registers (HLR), a visitor location registers (VLR), an Internet protocol multimedia subsystem (IMS), and/or the like. The network 100 may include other types of devices and nodes for receiving and transmitting voice, data, and combination information to and from radio transceivers, networks, the Internet, and other content delivery networks.

Any portable or non-portable communication device having network connectivity function, such as a cellular telephone, a computer, a set-top box, and the like, can operatively connect to the communication network 100.

The network 100 may employ any of the known and available communication protocols, such as Code Division Multiple Access (CDMA), Global System for Mobile communications (GSM), Universal Mobile Telecommunications System (UMTS), Long Term Evolution (LTE), or any other network protocol that facilitates communication between communication network 100 and a network enabled devices. The communication network 100 may also be compatible with future mobile communication standards including, but not limited to, LTE-Advanced and WIMAX-Advanced.

CEM system 110 may be implemented in a computer system comprising one or more computing devices of various types. CEM system 110 may be a discrete system, or it may be integrated within other systems including the systems and components within the communication network 100.

Exemplary Customer Experience Management System Configuration

Figure 2:
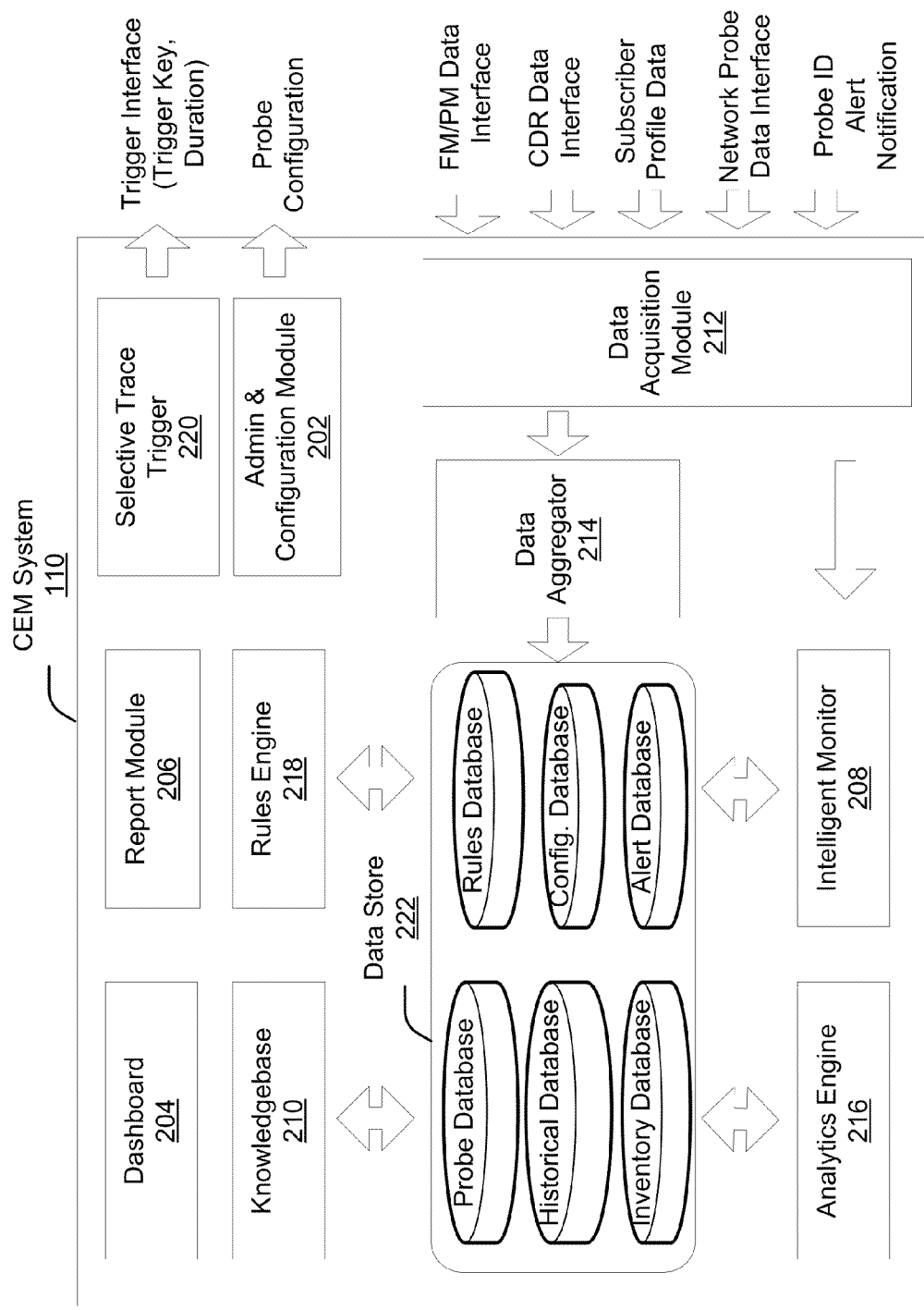
FIG. 2 is a block diagram showing an exemplary customer experience management system, according to an embodiment of the present disclosure.

FIG. 2 illustrates an exemplary CEM system 110 for providing fault detection and management, according to an embodiment of the present disclosure. The CEM system 110 includes an Admin and Configuration Module (ACM) 202, a Dashboard (DB) 204, a Report Module (RM) 206, an Intelligent Monitor (IM) 208, a knowledgebase (KB) 210, a Data Acquisition Module (DAM) 212, a Data Aggregator (DA) 214, an Analytics Engine (AE) 216, a Rules Engine (RE) 218, and a Selective Trace Trigger (STT) 220. The CEM system 110 further includes a data store 222, which may contain a collection of databases storing information including, but not limited to, probes, historical data, and the like.

The Admin and Configuration Module (ACM) 202 may provide a user interface for the CEM system administrator. Using this module the administrator may monitor and configure various components of the CEM system 110, referred to below as "engines" or "modules."

The Dashboard (DB) 204 may also provide a user interface, which displays a summary of alerts, KPIs and KQIs. DB 204 may also act as a quick reference point for the service management team to identify customer experience issues on a priority basis. DB 204 may also provide interfaces to drill down from top level KPIs to the low level network parameters and traces that correspond to each customer transaction.

The Report Module (RM) 206 may retrieve available data from the data store to build reports for the CEM system administrator or the user in a predefined format.

The Intelligent Monitor (IM) 208 proactively may detect network faults or problems that are likely to cause negative impact on the customer experience, perform root-cause analysis to identify the primary cause(s) of the problem/fault, and identify possible resolution(s) by communicating with other program modules of the CEM system 110. IM 208 is also configured to update the status to DB 204, the Knowledge Base (KB) 210 and any other relevant program modules or device.

The Knowledge Base (KB) 210 may store elements such as, but not limited to: network context, problem context; root-cause analysis results; and resolutions and/or recommendations suggested based on prior root-cause analyses, or the like. The root-cause analysis results may include elements such as, but not limited to: problem details, problem causes, percentages or weights to indicate relative importance among the problem causes, or the like. In some embodiments, the weightage of the root cause may be updated automatically based on the number of times the root cause was observed in the network context and problem context. The resolution and recommendations suggested may include elements such as, but not limited to: resolution details, problem details, solution, probability of the resolution or recommendation actually resolving the associated problem based on the resolution history, or the like.

The Data Acquisition Module (DAM) 212 manages data collection from multiple data sources, and routes the collected data to the appropriate program modules as necessary. DAM 212 may also communicate with the FM/PM data interface, the call-detail record (CDR) data interface, subscriber profile database (SPDB), network probe data interface and the probe ID alert notification. The collected data may be provided to the data aggregator (DA) 214 or directly to IM 208, where they are filtered for specific information, or otherwise processed into a predetermined format to be stored in the relevant database.

The Analytic Engine (AE) 216 may perform analyses upon request of other program components, using data from various sources. Among other methods, AE 216 may correlate events/alerts and performance data collected from different sources, such as configuration data and inventory data.

The Rules Engine (RE) 218 may manage and execute rules related to problem/fault conditions. For example, RE 218 may be configured to identify a single alert as a problem/fault condition, or alternatively, it may flag a problem or a fault condition only when multiple related alerts are detected. Rules executed by RE 218 can be configured in more elaborate ways by using other types of data constraints. For instance, the number of alerts can be cross-checked with relevant historical information from the data store 220 or KB 210.

Rules can be manually set by the administrator of the CEM system 110 via, for example, ACM 202. In addition, the administrator can permit RE 218 to automatically generate rules based on information or data available in the specific data sources such one or more databases in the data store 220, KB 210, and ACM 202. For instance, RE 218 may generate new rules based on historical fault/problem conditions. RE 218 can also create new rules or modify existing rules on a periodic basis or under certain conditions. The rules manually set by the administrator and automatically created by RE 218 may be stored in the rules database of data store 222.

As mentioned above, some of the information in the data store 222 (e.g., historical data, inventory data, etc.) may be updated automatically by the CEM system during its operation. KB 210 may also be configured to periodically gather fault/problem resolution data from the FM/PM system and to use available data from the data store 222 to create useful knowledge using AE 216 to expand CEM system knowledgebase (KB) 210. Configuring RE 218 to automatically generate rules based on those constantly evolving databases may create a learning mechanism for the CEM system 110. This measure can enable the CEM system 110 to perform pattern mapping, create new alert mechanisms, and/or continuously optimize the network in an automated manner.

The Selective Trace Trigger (STT) 220 may initiate trace collection from the probes based on the request from IM 208. The trace collection may use defined rules to collect alert-specific details such as trace duration, the destination probe, and the trace key.

The illustrated configuration of the CEMS 110 shown in FIG. 2 is provided for purposes of clear explanations, and is only one contemplated embodiment of the CEM system described herein. Although each component of the CEM system 110 is depicted as a discrete component in FIG. 2, in some other embodiments, some of the components may be implemented as a part of another component in the CEM system 110 or alternatively omitted. Further, it should be understood that the functionality of one component of the illustrated CEM system 110 may be implemented by a combination of multiple components of the CEM system 110. Embodiments shown in FIG. 2, or any of its parts or functions may be implemented using hardware, software, firmware, tangible computer readable media, or a combination thereof and may be implemented in one or more computer systems or other processing systems.

CEM System Preparation

Before deploying the CEM system 110 in the network 100, the CEM system 110 may need to be provided with the baseline KPIs, KQIs and the thresholds values set by a predetermined threshold calculation method. ACM 202 performs the threshold calculation for different KPIs and counters for each network probe. The counter related thresholds for probes may be set by the CEM administrator based on the preferences of the service provider. Baseline rules are discussed in more detail below.

A. Threshold Calculation Process for KPIs and KQIs

An example probe threshold calculation for KPIs is described below.

The theoretical mean value of KPI ($KPI_{th}$) may be calculated as part of the initial planning activity before deploying the network. There are several inputs that influence $KPI_{th}$, such as Performance Benchmark data (PBD), Regulatory policy/constraints, the Service provider's preferences, and/or network context.

PBDs may specify industry benchmark data for individual services. This may be at a higher level, and may not provide data that is contextual to a particular network. Service provider's preference for range of KPI values (limits) may be determined based on business plan of service provider, which may include the network capacity, load factor, type of services provided, and the like. Regulatory policies can influence KPIs as constraints in the range of values (limits). Based on these three factors and the network OEM's (original equipment manufacturer) inputs, $KPI_{th}$ may be calculated during the vendor system acceptance, involving the service provider and the network OEM. The theoretical mean value may be calculated for different network condition such as system load, capacity, and the like.

In a steady state production system, actual mean KPI values may be calculated based on a given network context (e.g., load condition). The required confidence interval also may be specified by the service provider (e.g., $95^{th}$ percentile). In this example, a particular mean KPI value qualifies for the $95^{th}$ percentile if it falls within the range of:

$$[\mu_T + (t_{CRIT95} \times S_e)] \text{ and } [\mu_T - (t_{CRIT95} \times S_e)],$$

where:

$\mu_T$ represents $KPI_{th}$;

$t_{CRIT95}$ represents the critical value of t for the 95th percentile from t distribution table against the selected degrees of freedom;

$S_e = \sigma/\sqrt{n}$, where $\sigma$ is the standard deviation of the sample and n is the sample size.

If the KPIs are not within the specified confidence interval, then the network configuration parameters may be tuned to bring the KPI's within the accepted range. This set of KPI's may form a baseline for the network under a particular network context. Based on different $KPI_{th}$ values for different network condition, a different set of baseline KPIs may be calculated. Similarly, the baseline KQIs may be calculated for different conditions or network context.

The Knowledgebase (KB) 210 may be updated with available information including the PBD, Regulatory policy data, $KPI_{th}$ and $KQI_{th}$ values, network context and the corresponding baseline KPI and KQI values. It should be noted that changes in factors such as Performance Benchmark data (PBD), and others discussed above, may require the baseline values to be recalculated using the same process. Based on the baseline KPIs and KQIs for a particular network context, RE 218 may determine the baseline threshold values according to the rules defined in the rules database.

B. Weightage Calculation

Figure 3A:
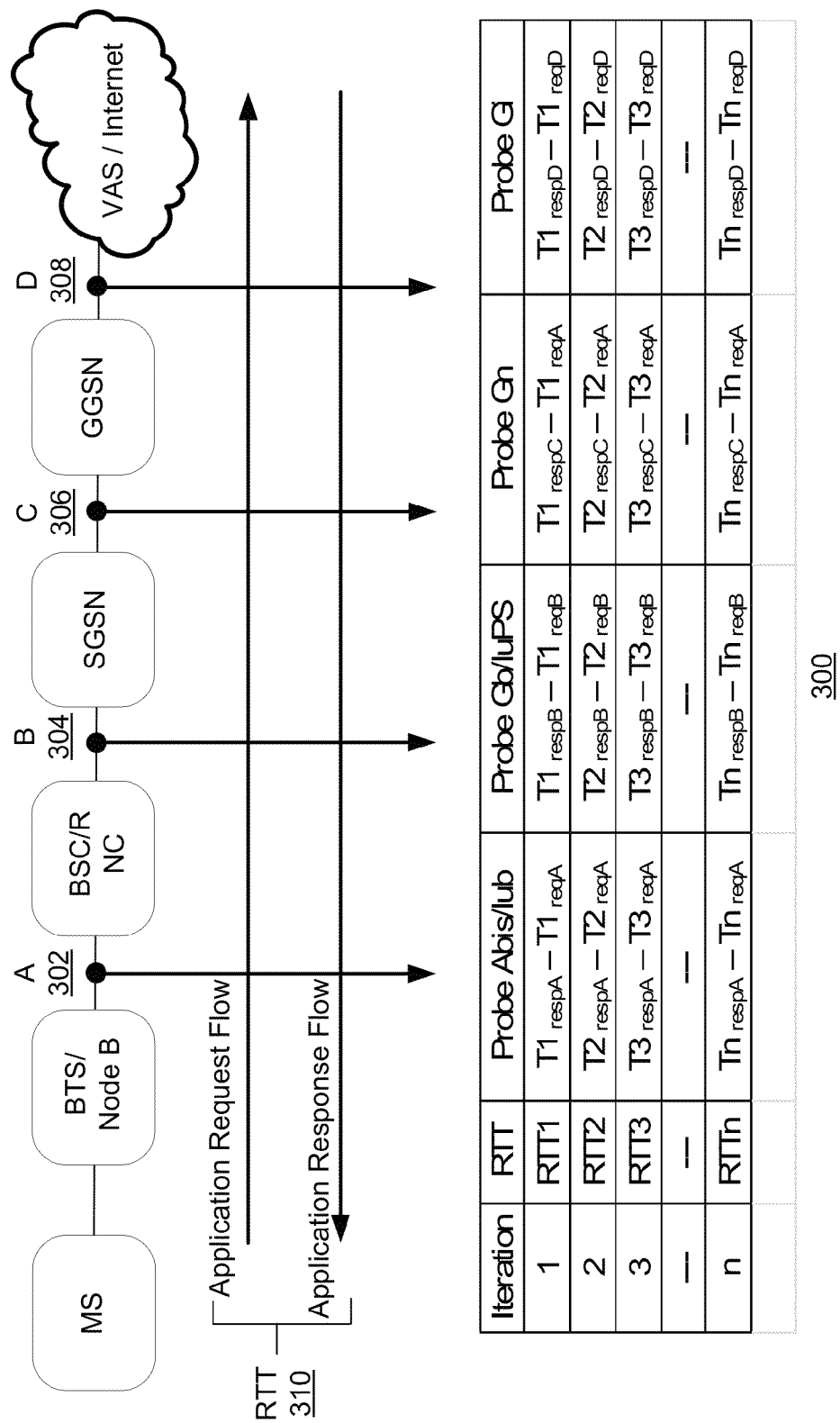

In addition to setting the baseline KPIs, KQIs and the thresholds, weightages for each KPI at different probe level may be estimated using a predetermined weightage calculation method. As an example, FIGS. 3A-3C show exemplary weightage calculation of Round Trip Time (RTT) KPI for the web browsing service for a mobile handset. As illustrated, for each web browsing request originated from the handset, RTT 310 may be measured separately at each segment of the network using the probes (e.g., FIG. 3A, A 302, B 304, C 306, D 308) deployed at respective interfaces. The RTT calculated at each probe measures the total time between request and response in the network in the egress (outward) direction. This iteration may be repeated multiple (n) times until the standard deviation of the RTT measured at each probe is negligibly small or the mean falls within $95^{th}$ percentile of the confidence interval. It should be noted that the confidence level of $95^{th}$ percentile may be selected as an example; but in practice, the confidence level can vary in the T-distribution depending on the accuracy required by the service provider. Each probe may be configured to provide alerts when the RTT value crosses the threshold value. For instance, the mean value at $95^{th}$ percentile of the confidence interval can be set as the threshold value for the KPI.

In this setting, RTT measurements can be calculated by each probe, and an alert can be generated when the RTT value crosses the threshold value set at that interface probe. To determine weightage values for each network segment level KPI measurement, however, a scoring mechanism can be incorporated. Here, the segment with the highest score may be given highest weightage.

The score may be calculated by first determining the mean and the standard deviation of the samples at each segment. The calculated value also may be normalized at each segment by calculating the z-score, which indicates how many standard deviations the sample mean deviates from the theoretical mean. From this point the weightage may be calculated by determining the proportion of the total RTT contributed by each segment's normalized RTT.

Similar methodology can be applied for other KPIs such as throughput, jitter, and the like. Also, different KPIs and KQIs associated with different services can be estimated in a similar manner.

C. Establishing Relationships Between KPIs and KQIs

The relationship between the KPIs and the KQIs may be initially defined by a CEM system administrator or other authorized person of the service provider, and stored in KB 210. The relationship stored in KB 210 may be updated by KB 210 from time to time during the operation of CEM system 110.

D. Establishing Relationships Between KPIs and Counters

The relationship between the KPIs and the counters may be initially defined by a CEMS administrator or other authorized person of the service provider, and stored in KB 210. The relationship stored in KB 210 may be updated by KB 210 from time to time during the operation of CEM system 110.

E. Creation of Baseline Rules

The baseline rules may be initially defined by a CEM system administrator or other authorized person of the service provider, and stored in the rule database in the data store. The rules stored in the rule database may be updated by KB 210 from time to time during the operation of CEM system 110.

F. Setting Relevant Thresholds for Probes and CEM System Components

The thresholds for probes and other CEM system components may be initially defined by a CEM system administrator or other authorized person of the service provider, and stored in KB 210. These threshold values in KB 210 may be updated from time to time during the operation of the CEM system 110.

CEM System Configuration

CEM System main configuration may be performed by ACM 202. During the main configuration process, all data exchange interfaces may be configured by a CEM system administrator having appropriate information. Otherwise, the network-related configuration may be configured by ACM 202 from the data retrieved from the inventory database in the data store 222. ACM 202 may also configure probe thresholds based on the baseline values as determined in the previous step.

ACM 202 may be configured to store configuration of the CEM system in the configuration database of the data store 222. ACM 202 may be configured to update the configuration database following any change in the interfaces configuration, network elements or baseline threshold values. Also, ACM 202 may perform the necessary administration for any change of configurations that requires administering any probe or other external elements and systems. The initial set of rules can be modified by an authorized person of service provider through ACM 202 when needed, and stored in the rule database. In addition, the counter related thresholds for probes may be set by ACM 202 to respective probes.

Proactive Problem/Fault Detection Process

Figure 4A:
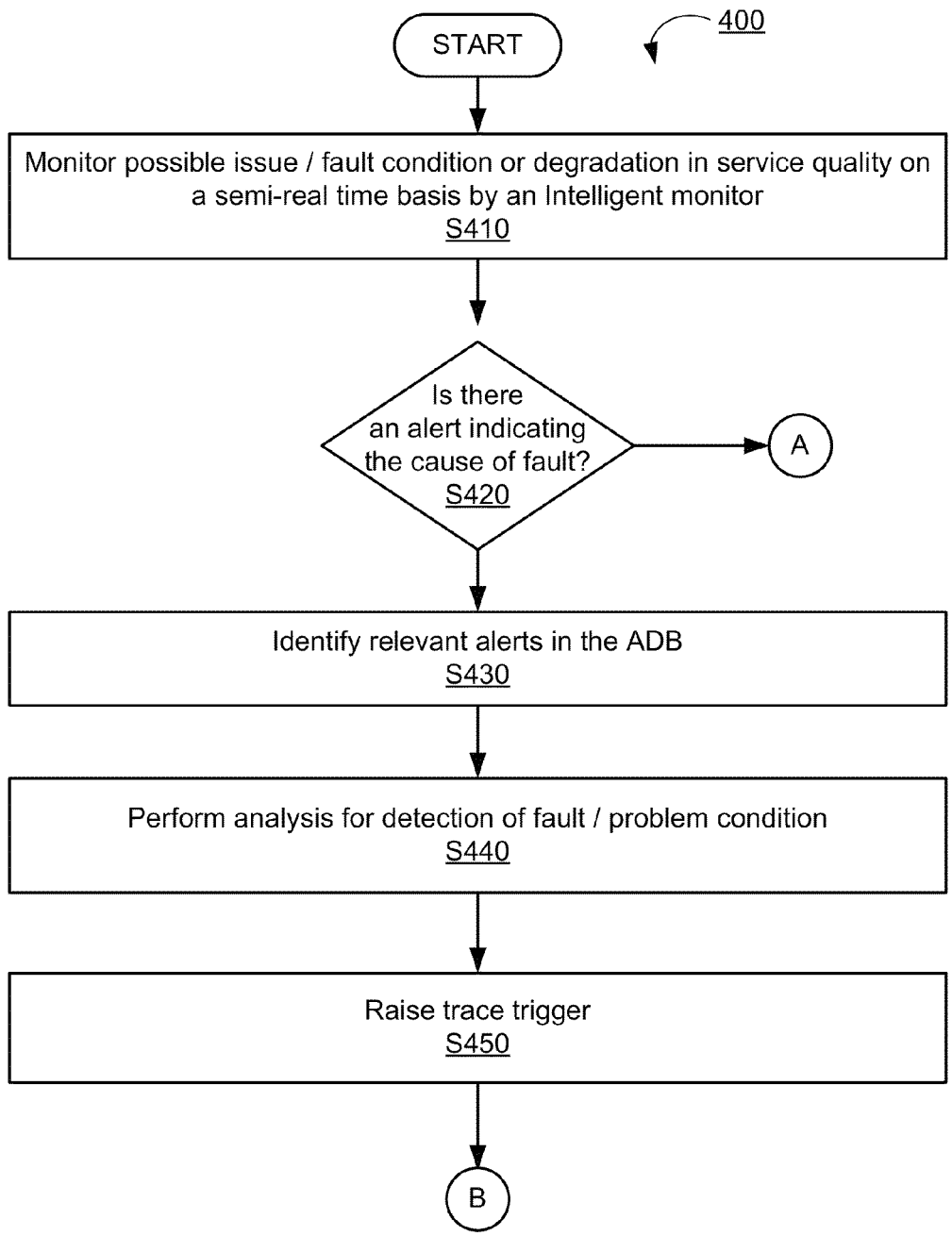
FIGS. 4A-B illustrate a flow diagram illustrating an exemplary proactive network problem detection process, according to an embodiment of the present disclosure.
Figure 4B:
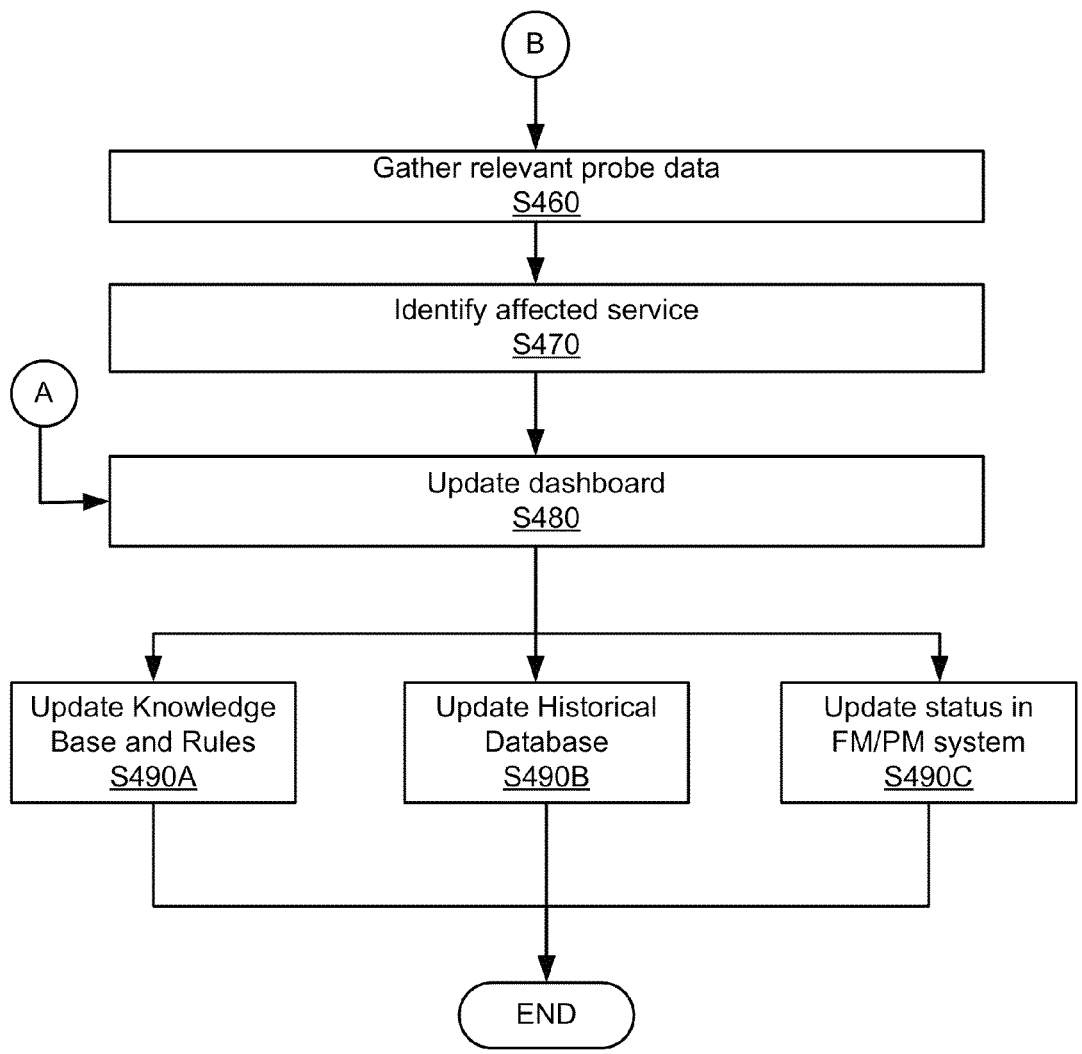

Following preparation and configuration, the CEM system 110 may be deployed in the network and IM 208 proactively monitors for possible problems and faults conditions. FIGS. 4A-B illustrate a flow diagram illustrating the proactive problem/fault detection process 400 of the CEM system, according to an embodiment of the present disclosure. In S410, IM 208 of the CEM system 110 may monitor for possible problem/fault conditions or degradation in service quality on a substantially real-time basis. Upon detecting a probe alert (PA), IM 208 may begin the proactive fault detection step.

In S420, if the alert condition alone sufficiently represents a fault condition according to the rules provided by RE 218, then IM 208 may analyze the alert message to search for a known error code. If a known error-code has been found, IM 208 may search KB 210 for corresponding resolutions. IM 208 may also update DB 204, the FM/PM system, and KB 210 with the detected problem along with the suggested solution, as shown in S480.

If the error-code was not found in the alert message, however, IM 208 may consult with RE 218 and identify other relevant alerts from the alert database (ADB) as shown in S430. In S440, IM 208 uses AE 216 and analyzes the relevant alerts obtained from the ADB.

If a clear problem condition has been detected in S440, IM 208 may initiate a trace trigger through the Selective Trace Trigger (STT) 220, employing the Trace-Trigger-Interface (TTI) as shown in S450. This action begins gathering probe data through the Probe-Data-Interface (PDI) for a limited duration as specified in the trace trigger. In S460, probe data may be gathered by the Data-Acquisition-Module (DAM) 212. The Data-Aggregator (DA) 214 may convert the probe data in to the format designated by the CEM system 110, and store the converted probe data in the probe database (PDB).

In S470, IM 208 may analyze the gathered probe data for detection of possible problem/fault condition by using the AE 216, KB 210, information from the historical database (HDB). If necessary, IM 208 may also begin gathering relevant data from the FM/PM system and CDR-data from the OSS system for further analysis. Once a clear possibility of fault/problem condition has been detected by IM 208, it may obtain information from KB 210 to find a set of relevant and suggestive solution for the problem. IM 208 may also update DB 204, the FM/PM system, and/or KB 210 with the detected problem along with the suggested solution, as shown in S480.

In case no solution is found in KB 210, IM 208 may initiate the root cause analysis using AE 216, trace data, additional inventory data from inventory database (IDB) and configuration data from configuration database (CDB), based on a set of rules executed by RE 218. IM 208 also may use the KQI-KPI-Counter relationship information along with the baseline values defined in KB 210 to identify the root cause of the identified fault, and come up with a set of suggestive actions for resolution of the possible problem/fault condition detected. The same information may then update in DB 204, FM/PM system and/or KB 210, as was done in S480.

For example, the KB 210 may be updated as follows. Using the network context and/or problem context, a lookup may be performed for a knowledge element (KE). If the KE is found, then in some embodiments, nothing need be done. If the KE is not found, then a new entry may be created for the new KE. Based on any resolution alert obtained, the KE may be updated with the actual resolution of the problem from the FM/PM system. In the scenario where the problem and actual resolution entry exist, the weightage value and trigger rules for it may be updated and modified, respectively. If the problem and actual resolution entry do not exist, new KEs may be created for the problem and actual resolution, and trigger rules may be modified based on the new KEs. In some embodiments, if the weightage of one or more existing problems and/or resolutions becomes smaller than a pre-specified threshold level, those KEs may be deleted, and the trigger rules modified accordingly.

Rules modification may be triggered by creation or updating of a KE. For example, upon creation of the knowledge element, a trigger may be sent to the Rules Engine, which may analyze the problem context, root cause, and the resolution. Based on the probability or weightage of the root cause analysis and resolution, a new rule may be created. The new rule may include one or more combinations of network context, problem context, rule trigger condition, threshold values, action steps, and linked rules. The rules may be updated or linked to other associated rules either manually or based on the KE updating process. Upon updating a KE, a trigger may be sent to the Rules Engine, which may analyze the problem context, root cause analysis, and the resolution. Based on the probability or weightage of the root cause analysis and/or resolution, a new rule may be created or the existing rule may be updated, or the link to an existing rule may be created or updated.

Root Cause Analysis

Figure 5A:
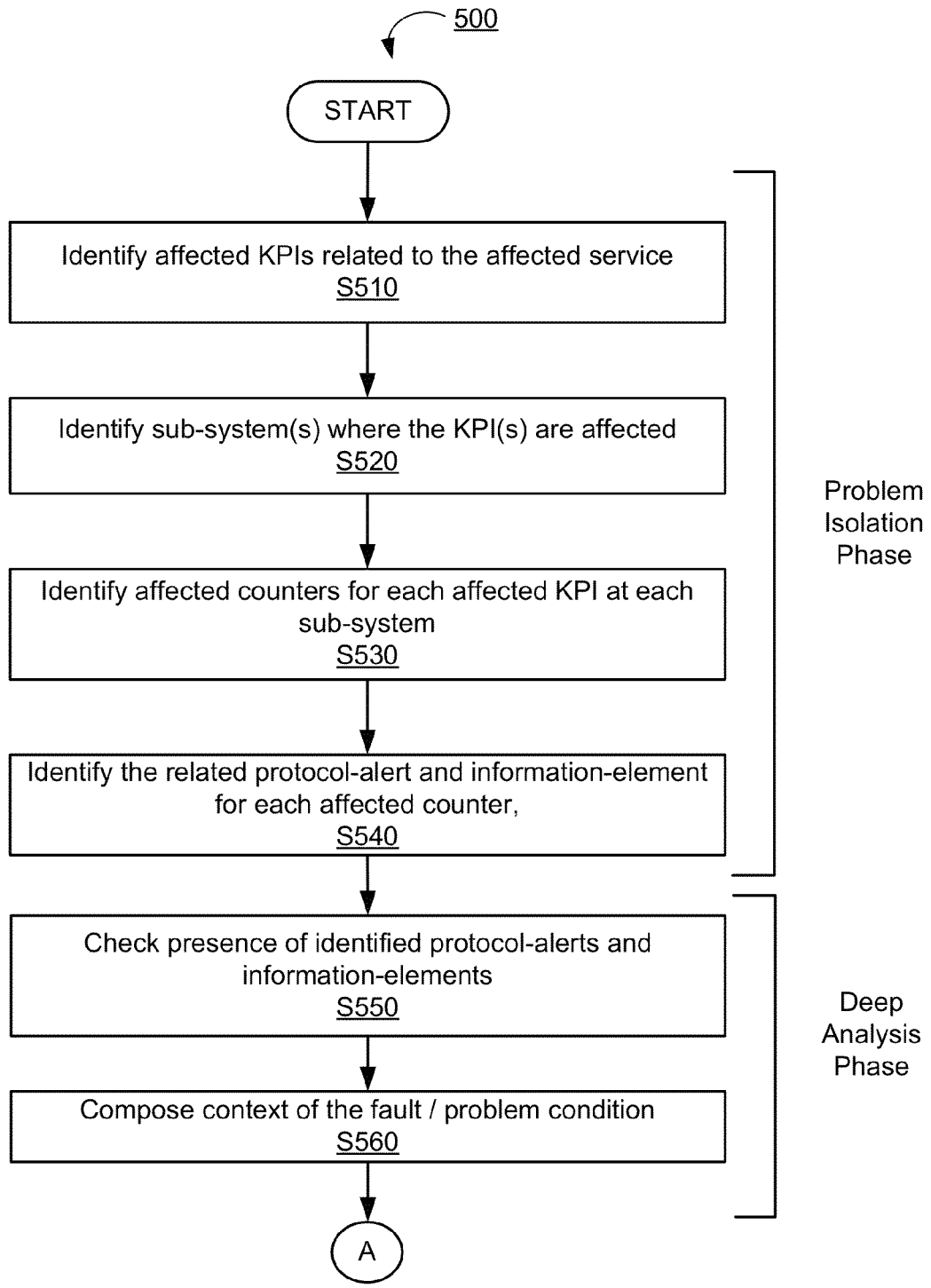
FIGS. 5A-B illustrate a flow diagram illustrating an exemplary process of performing the root cause analysis 500, according to an embodiment of the present disclosure.
Figure 5B:
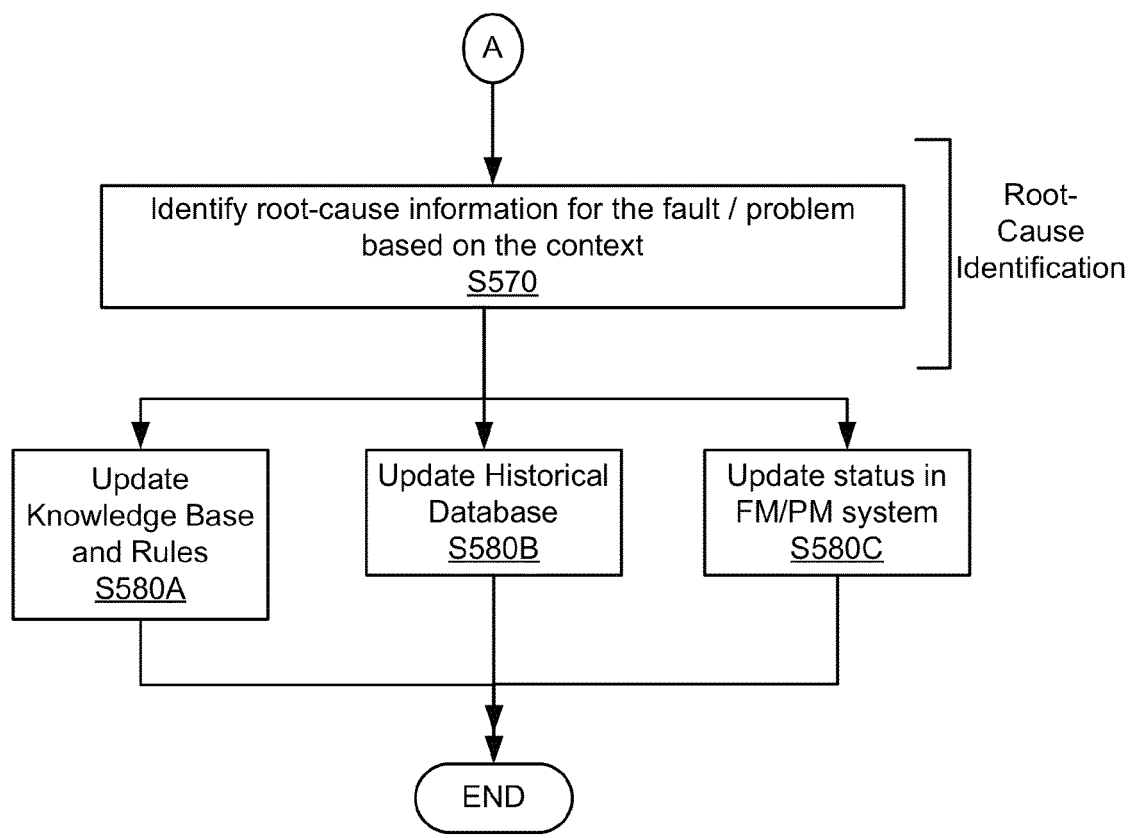

FIGS. 5A-B illustrate a flowchart illustrating an exemplary process for performing the root cause analysis 500, according to an embodiment of the present disclosure. As shown in FIGS. 5A-B, the entire root cause analysis process may include multiple phases. In a problem isolation phase, for example, CEM system 110 may perform the sub-system level isolation to identify KPIs and counters related to the affected services. This phase may comprise identifying KPIs that are actually affected to the affected services (S510). This can be performed by simple comparison of KPI values from different nodes, or multiple comparisons. In S520, the sub-systems (s) where the KPIs are affected may be identified. For each affected KPI at each sub-system, related counters may be identified (S530). For each affected counter, related protocol-alert and information-element may be identified (S540).

Deeper analysis of the root cause may be conducted by checking the presence of information-elements from decoded protocol messages and protocol-alerts from the trace data gathered from the probe associated with the identified subsystem (S550). Then, in S560, the context of the fault/problem condition may be composed such that all details starting from KQI to KPI and to protocol event/message are obtained. With this information, the root cause of the fault/problem condition may be identified from KB 210 in S570. Once the root cause of the problem is identified, the CEM system 110 may identify a set of suggestive actions from KB 210, which can prevent the potential problem from occurring or minimize the effect of the problem/fault conditions.

Exemplary Fault Detection and Root Cause Analysis

Figure 6A:
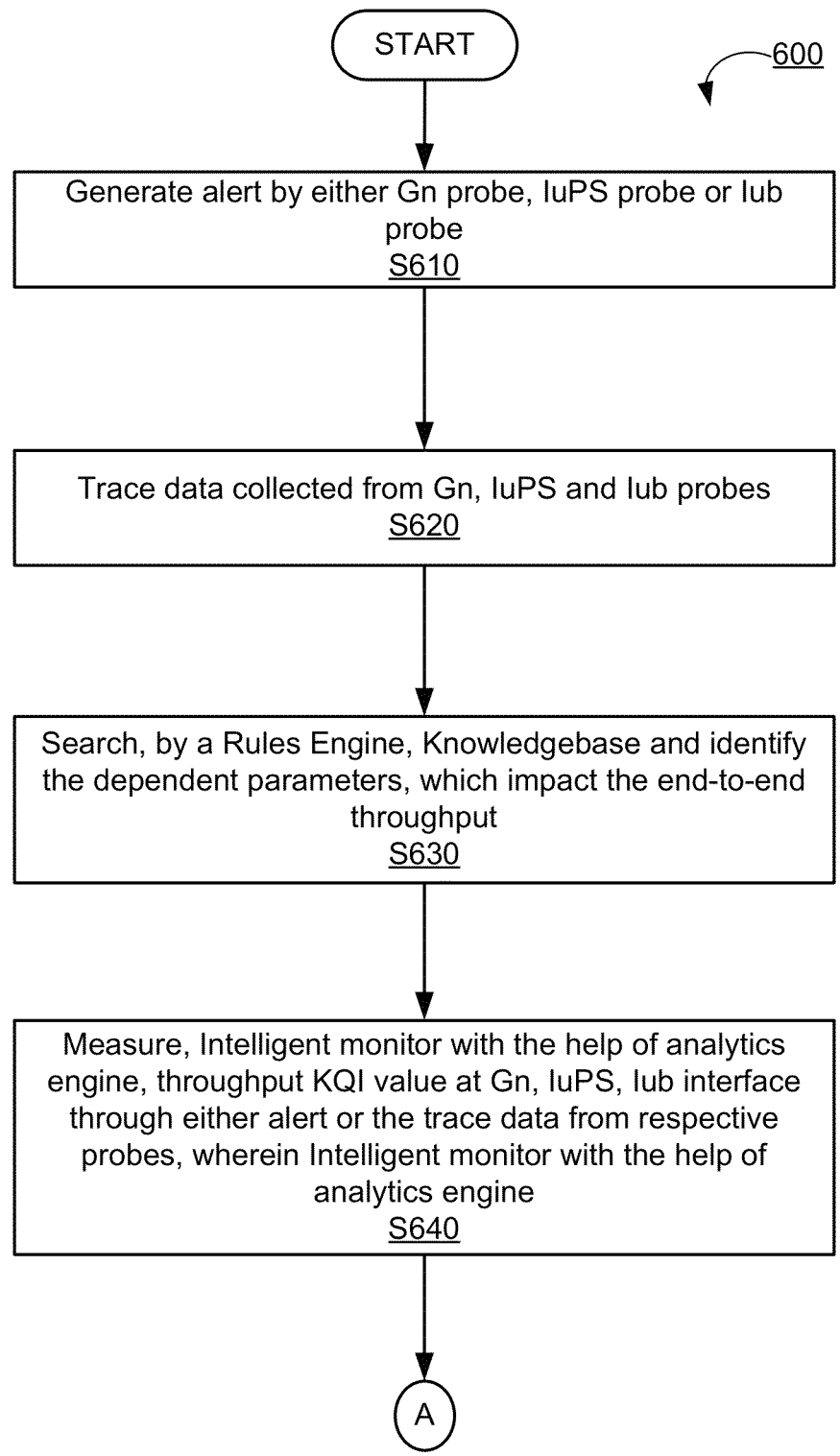
FIGS. 6A-B illustrate a flow diagram illustrating exemplary steps of the proactive network problem detection and root cause analysis process carried out by an exemplary customer experience management system, according to an embodiment of the present disclosure.
Figure 6B:
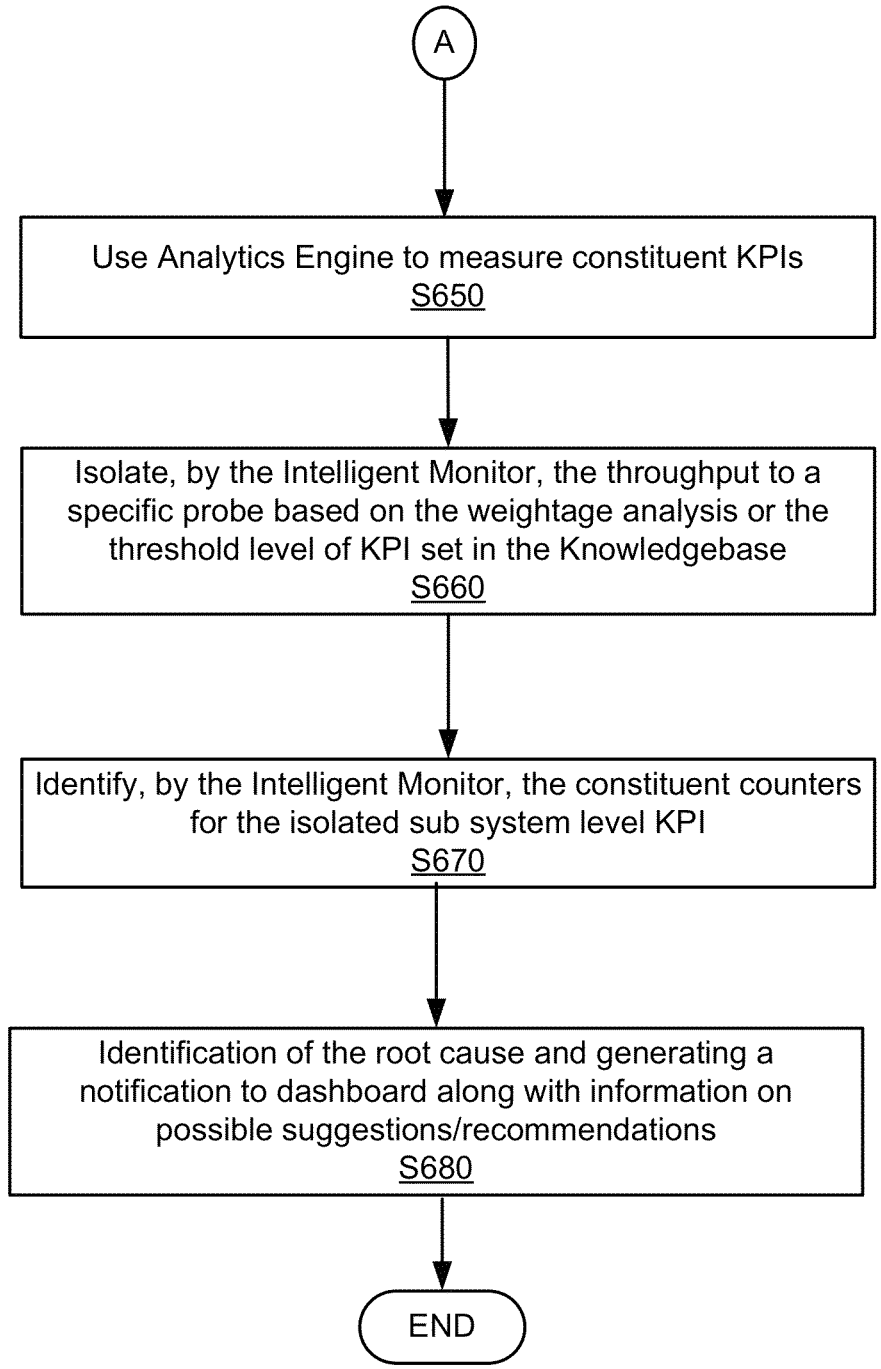

FIGS. 6A-B illustrate a flowchart illustrating exemplary steps of the proactive problem/fault detection and the root cause analysis process 600 carried out by the CEM system 110, according to an embodiment of the present disclosure. In S610, an alert may be generated by the Gn, IuPS or Iub probe. In S620, trace data may be collected from the Gn, Imp's and Iub probes. As described above, the trace data can be obtained by the Selective Trace Trigger (STT) 220 through the Trace-Trigger-Interface (TTI). In S630, RE 218 may search KB 210 and identify the dependent parameters that may impact the end-to-end throughput. In S640, IM 208 may use AE 216 to measure throughput KQI value at the Gn, IuPS, or Iub interface through either alert or the trace data from respective probes. In S650, IM 208 may also use AE 216 to measure constituent KPIs such as application throughput at the Gn and IuPS interfaces, radio link control (RLC) throughput at the Iub interface from the probe trace and protocol transaction data. Using the data obtained in the previous step, in S660, IM 208 may isolate the throughput to a specific probe based on the weightage analysis or the threshold level of KPI set in KB 210, depending on the rules configured in the rules database.

In S670, IM 208 identifies the constituent counters for the isolated sub system level KPI. For example, the Iub level RLC throughput may be found to be lower than optimum level defined by KB 210, and dependent counters can be the number of traffic control channel (TCH) drop, the number of radio access technology (RAT) charges, the radio resource control (RRC) state transitions and the bit error rate (BER). If any of the counter values shows variation from the optimum value as defined in KB 210, IM 208 may be configured to identify the counter that shows the variation as the cause of degradation as shown in S680. Once the root cause for the throughput degradation is identified, IM 208 may obtain possible suggestions/recommendations to solve the identified root cause from KB 210, generate a report by RM 206, and may send notification to DB 204.

The specification has described systems and methods for providing customer experience management solutions that enable proactive measurement of customer experience by processing discrete network events in substantially real-time basis and identifying a pattern that leads to the root causes of potential problems before the event transforms into a major customer experience impacting issue. The boundaries of the functional building blocks and signals have been arbitrarily defined herein for the convenience of the description. Alternative boundaries can be defined so long as the specified functions and relationships thereof are appropriately performed. Also, the illustrated steps are set out to explain the embodiment shown, and it should be anticipated that ongoing technological development will change the manner in which particular functions are performed. These examples are presented herein for purposes of illustration, and not limitation. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for proactive customer experience management in a communication network, comprising:
   a) obtaining a performance-indicating alert (PA) from at least one probe;
   b) identifying relevant alerts from an alert database in absence of possible fault condition from the PA;
   c) determining a possible problem condition from the PA and the identified relevant alerts;
   d) raising trace trigger for gathering relevant trace data;
   e) determining specific problem condition and relevant cause, based on gathered trace data and relevant data from PM/FM, CDR and OSS systems;
   f) determining appropriate recommendation for resolution of the determined specific problem condition;
   g) recalculating a probe alert threshold value for triggering the performance-indicating probe alert;
   h) providing the recalculated probe alert threshold value for modifying a configuration of a performance-indicating probe;
   i) updating a user interface dashboard using the determination of a root cause of the possible problem and the recommendation for resolution of the possible problem; and
   j) updating new knowledge into a knowledge base with problem-context, resolution, relevant adjustments to alerts, thresholds and rules.

2. The method of claim 1, wherein the relevant alerts are identified from the alert database using a rules engine applying pre-defined rules.

3. The method of claim 1, wherein the possible problem condition is determined using an analytic engine operating on the PA and the identified relevant alerts.

4. The method of claim 1, wherein the trace trigger is configured to trigger gathering probe data through a Probe-Data-Interface for a limited duration specified in the trace trigger.

5. The method of claim 3, wherein the specific problem condition and relevant cause are determined using the analytic engine and information from a historical database.

6. The method of claim 1, wherein the appropriate recommendation for resolution of the determined specific problem condition is retrieved from the knowledge base.

7. The method of claim 1, wherein the performance-indicating probe alert is obtained from at least one of: an external hardware probe operatively connected at a network interface; an end-user device; a service application server; and a communication network component.

8. The method of claim 1, wherein the possible problem condition includes degradation of an end-user service quality indicator.

9. The method of claim 8, wherein the degradation included in the possible problem condition is a future degradation of the end-user service quality indicator.

10. The method of claim 1, wherein the root cause analysis utilizes historical aggregated performance data to determine the root cause of the possible problem.

11. The method of claim 1, wherein the recalculation utilizes the aggregated performance data and the recommendation for resolution of the root cause of the possible problem.

12. The method of claim 1, further comprising: updating the knowledge base using the aggregated performance data and the root cause of the possible problem.

13. The method of claim 1, further comprising: triggering, based on the root cause analysis, the gathering of the trace data via the selective trace trigger.

14. A proactive communication network customer experience management system, comprising: a hardware processor; and a memory device operatively connected to the hardware processor and storing instructions executable by the hardware processor for:
- a) obtaining a performance-indicating alert (PA) from at least one probe;
- b) identifying relevant alerts from a alert database in absence of possible fault condition from the PA;
- c) determining a possible problem condition from the PA and the identified relevant alerts;
- d) raising trace trigger for gathering relevant trace data;
- e) determining specific problem condition and relevant cause, based on gathered trace data and relevant data from PM/FM, CDR and OSS systems;
- f) determining appropriate recommendation for resolution of the determined specific problem condition;
- g) recalculating a probe alert threshold value for triggering the performance-indicating probe alert;
- h) providing the recalculated probe alert threshold value for modifying a configuration of a performance-indicating probe;
- i) updating a user interface dashboard using the determination of a root cause of the possible problem and the recommendation for resolution of the possible problem; and
- j) updating new knowledge into a knowledge base with problem-context, resolution, relevant adjustments to alerts, thresholds and rules.

15. A non-transitory computer-readable storage medium storing computer-executable instructions for communication network customer experience management, the instructions being executable by a computer for:
- a) obtaining a performance-indicating alert (PA) from at least one probe;
- b) identifying relevant alerts from a alert database in absence of possible fault condition from the PA;
- c) determining a possible problem condition from the PA and the identified relevant alerts;
- d) raising trace trigger for gathering relevant trace data;
- e) determining specific problem condition and relevant cause, based on gathered trace data and relevant data from PM/FM, CDR and OSS systems;
- f) determining appropriate recommendation for resolution of the determined specific problem condition;
- g) recalculating a probe alert threshold value for triggering the performance-indicating probe alert;
- h) providing the recalculated probe alert threshold value for modifying a configuration of a performance-indicating probe;
- i) updating a user interface dashboard using the determination of a root cause of the possible problem and the recommendation for resolution of the possible problem; and
- j) updating new knowledge into a knowledge base with problem-context, resolution, relevant adjustments to alerts, thresholds and rules.

* * * * *